United States Patent
Schwinke et al.

(10) Patent No.: US 7,398,082 B2
(45) Date of Patent: Jul. 8, 2008

(54) METHOD OF CONFIGURING AN IN-VEHICLE TELEMATICS UNIT

(75) Inventors: Steven P. Schwinke, Plymouth, MI (US); William E. Mazzara, Jr., Drayton Plains, MI (US); William E. Italia, Howell, MI (US)

(73) Assignee: General Motors Corporation, Detroit, MI (US)

( * ) Notice: Subject to any disclaimer, the term of this patent is extended or adjusted under 35 U.S.C. 154(b) by 308 days.

(21) Appl. No.: 11/253,172

(22) Filed: Oct. 18, 2005

(65) Prior Publication Data

US 2006/0052092 A1     Mar. 9, 2006

Related U.S. Application Data

(63) Continuation of application No. 10/243,481, filed on Sep. 13, 2002, now abandoned, and a continuation-in-part of application No. 10/209,014, filed on Jul. 31, 2002, now Pat. No. 7,292,848.

(51) Int. Cl.
*H04M 3/00* (2006.01)

(52) U.S. Cl. .................... 455/419; 455/415; 455/414.1; 455/435.1; 455/418; 455/420; 455/12.1; 455/11.1

(58) Field of Classification Search ................. 455/434, 455/551, 432.1, 418, 420, 976.1, 550.1, 419, 455/435.1, 414.3, 414.2
See application file for complete search history.

(56) References Cited

U.S. PATENT DOCUMENTS

| 5,950,130 | A  | * | 9/1999  | Coursey ................. 455/432.1 |
| 6,016,427 | A  | * | 1/2000  | Barber et al. ............... 455/434 |
| 6,556,840 | B2 | * | 4/2003  | Zicker et al. ................ 455/551 |
| 7,292,848 | B2 | * | 11/2007 | Mazzara et al. ............. 455/419 |
| 2003/0022689 | A1 | * | 1/2003 | McElwain et al. .......... 455/551 |
| 2004/0203692 | A1 | * | 10/2004 | Schwinke et al. ........... 455/419 |

* cited by examiner

*Primary Examiner*—David Q Nguyen

(57) ABSTRACT

The present invention present invention provides a method and system for configuring a telematics unit in a mobile vehicle. An assigned system identifier is stored in the telematics unit, and a determination is made as to whether the assigned system identifier corresponds to a broadcast system identifier. A wireless carrier is called based on the determination, and a mobile identification number is received from the wireless carrier.

19 Claims, 3 Drawing Sheets

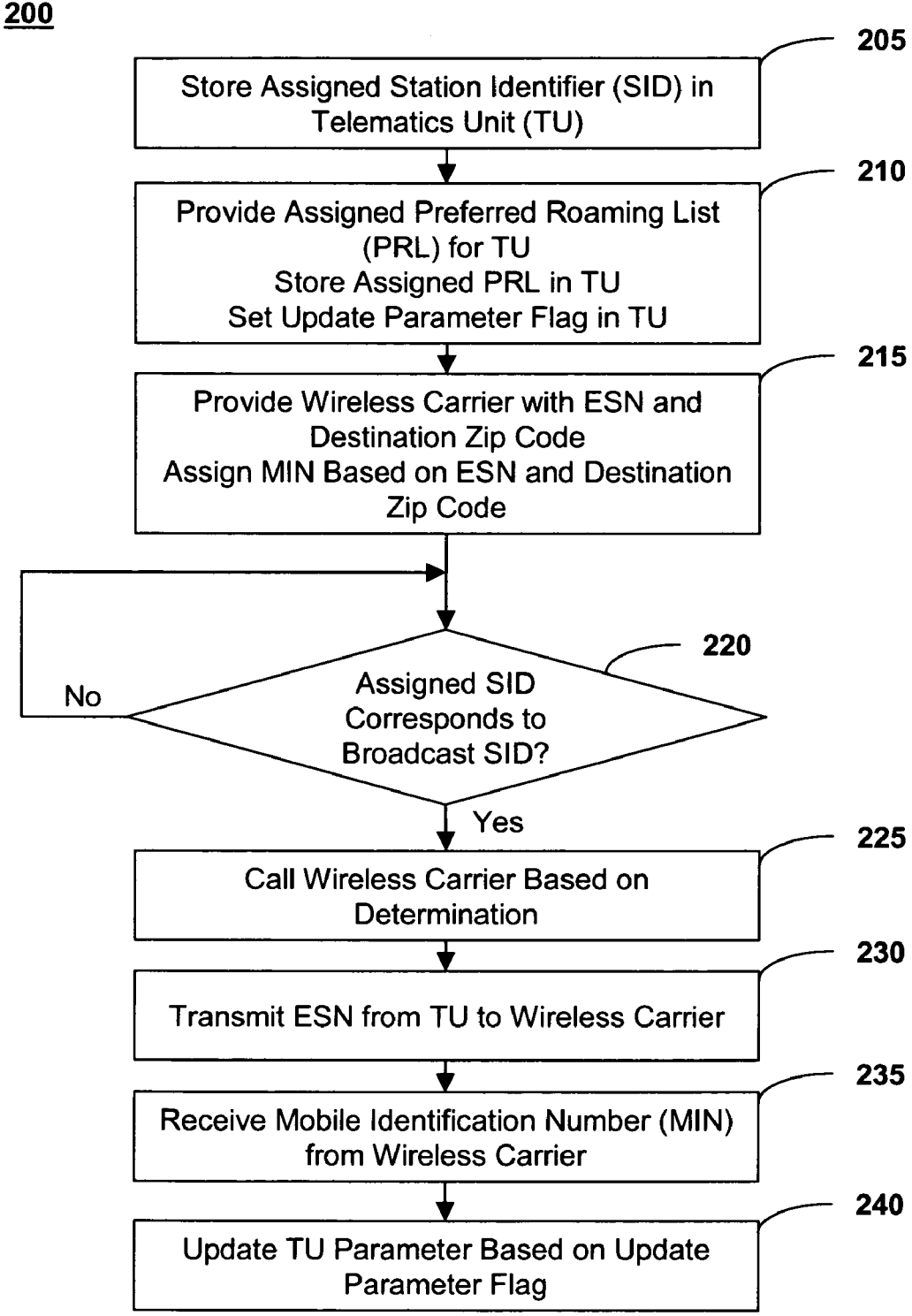

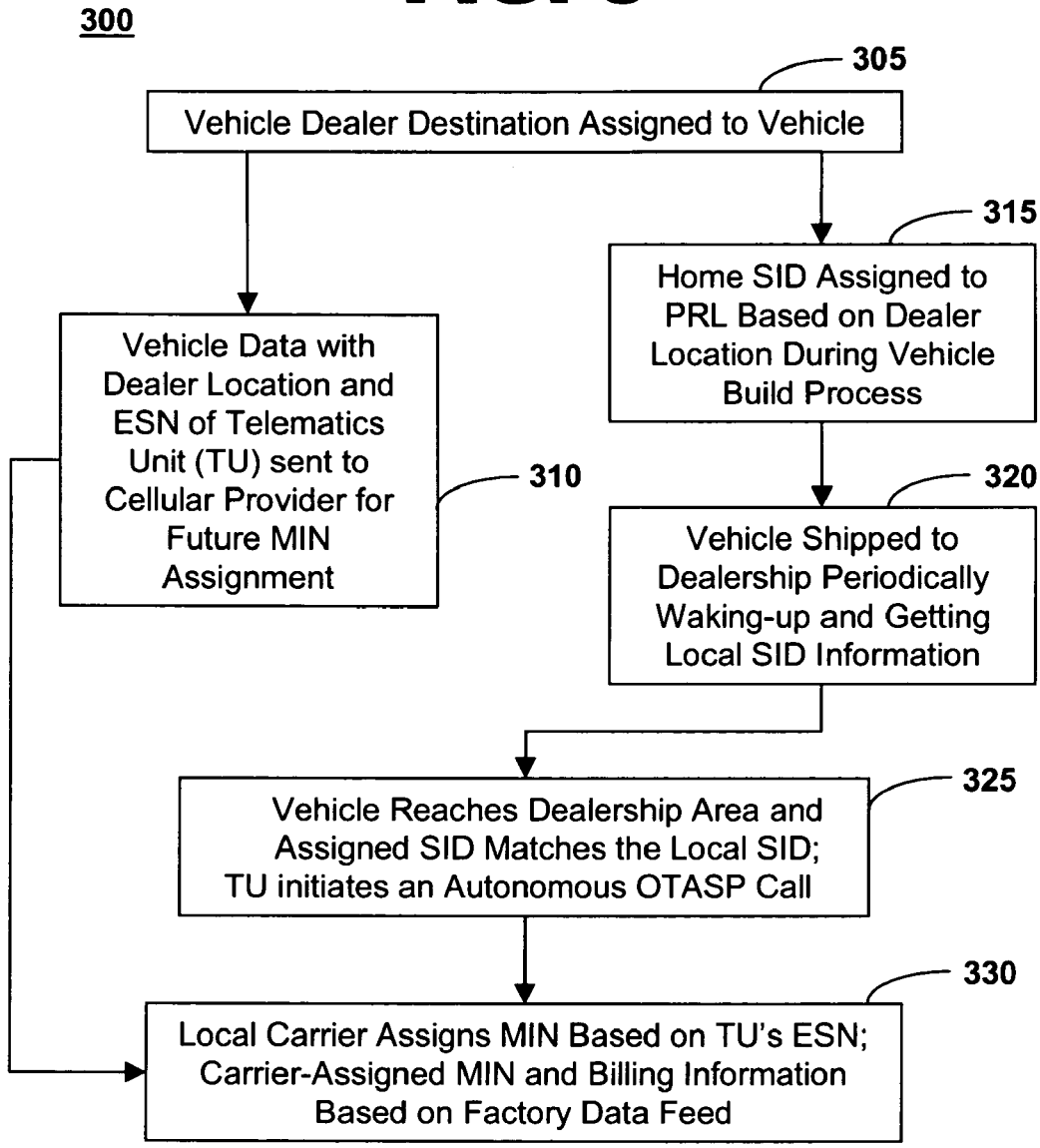

METHOD OF CONFIGURING AN IN-VEHICLE TELEMATICS UNIT

RELATED APPLICATIONS

This application is a continuation of U.S. patent application Ser. No. 10/243,481 filed Sep. 13, 2002 and a continuation in part application of U.S. patent application Ser. No. 10/209,014 filed Jul. 31, 2002, and claims priority to each of U.S. patent application Ser. No. 10/243,481 and U.S. patent application Ser. No. 10/209,014 filed Jul. 31, 2002.

FIELD OF THE INVENTION

This invention generally relates to a method of operating a wireless communication system. In particular, the invention relates to a method and system for activating and configuring a telematics unit in a mobile vehicle.

BACKGROUND OF THE INVENTION

One of the fastest growing areas of communications technology is related to automobile network solutions for voice communications, data transfers, and telematics services. An increasing number of mobile vehicles are being equipped with wireless communication devices, requiring unique, geographically specific mobile-phone identification numbers (MINs), i.e. telephone numbers, to be loaded and stored into a telematics unit in the vehicle. Because the final destination and owner of a vehicle are not always known, vehicle manufacturers and dealerships need more efficient ways for preparing a wireless communication device in a vehicle before delivery to the new owner. The process of loading location-dependent telephone numbers into the unit should be as efficient and uncomplicated as possible.

A digital wireless telephony mobile phone, whether separate from or embedded in the telematics unit, is typically shipped without a mobile identification number (MIN) or a geographic-specific mobile identification number (geo-MIN) programmed into the unit. The MIN is a phone number that identifies the embedded phone of the telematics unit within a wireless phone network. The MIN is required for a local wireless telephony service provider to properly address the cellular phone and for the mobile unit to register on the system in the home region or while roaming. Cellular phones may be configured and activated using over-the-air service provisioning (OTASP), a standard specified in TIA/EIA/IS-683-A (1998), "Over-the-Air Service Provisioning of Mobile Stations in Spread Spectrum Systems." The wireless telephony service provider may configure the cellular phone and the cellular network using OTASP. If an embedded phone in a telematics unit is to be programmed without OTASP, it may be done manually, with voice-recognition software, or with over-the-air functions. Manual programming requires knowledge on the part of the consumer or vendor representative to be able to manipulate the device and knowledge of the proper parameter values to program, and to converse with the wireless service provider for assigning an appropriate MIN and MDN (mobile directory number).

Because of the complexities in setting up network communications and instrument settings for any in-vehicle wireless communication unit, the business and information delivery methods among the vehicle and network device manufacturers, wireless carriers, telematics services call centers and vehicle dealerships would benefit from streamlining the process and making it nearly automatic.

The dealership has often been required to initialize the telematics unit, and sometimes this process of initializing is cumbersome, requiring more than a little time and effort for the dealership and owner to activate the unit, and resulting in time delays for configuring a telematics unit with a geographic-specific mobile identification number, preferred roaming lists, and other phone parameters. It may take upwards to 72 hours for a wireless carrier to be able to assign a phone number for the embedded phone of the telematics unit.

The vehicle assembly plant usually knows to which dealership a vehicle will be delivered and sometimes even the buyer, although it may not know or be able to obtain a geo-MIN or a suitable MDN for a specific unit. Furthermore, excessive charges may be incurred when loading a prescribed MIN into the telematics unit before the vehicle is sold and delivered. It would be advantageous for the telematics unit to be preprogrammed with configuration settings and information specific to the location of the dealership or future owner at the vehicle assembly plant, thereby speeding up the process of activating and configuring the telematics unit when it is delivered.

It is an object of this invention, therefore, to provide a system and method to configure an in-vehicle telematics unit in a more efficient and timely way that employs new configuration strategies and leverages newer networking capabilities among telematics service providers, vehicle dealerships and wireless service providers, and to overcome the challenges and obstacles described above.

SUMMARY OF THE INVENTION

The present invention provides a method and system of configuring a telematics unit in a mobile vehicle. An assigned system identifier (SID) in the telematics unit is stored. A determination is made as to whether the assigned system identifier corresponds to a broadcast system identifier, a wireless carrier is called based on the determination, and a mobile identification number is received from the wireless carrier. An assigned preferred roaming list for the telematics unit may be provided and may be stored in the telematics unit.

The wireless carrier may be provided with an electronic serial number corresponding to the telematics unit and a destination zip code, and the mobile identification number may be assigned based on the electronic serial number and destination zip code.

An electronic serial number may be transmitted from the telematics unit to the wireless carrier, after which a mobile identification number may be received from the wireless carrier. An update parameter flag in the telematics unit may be set, and a telematics unit parameter may be updated based on the update parameter flag. Another aspect of the invention includes a computer usable medium with a program to configure an in-vehicle telematics unit.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention is illustrated by the accompanying drawings of various embodiments and the detailed description given below. The drawings should not be taken to limit the invention to the specific embodiments, but are for explanation and understanding. The foregoing aspects and other attendant advantages of the present invention will become more readily appreciated by the detailed description taken in conjunction with the accompanying drawings, wherein:

FIG. 2 is a flow diagram of one embodiment of a method of configuring a telematics unit in a mobile vehicle, in accordance with the current invention; and FIG. 3 is a flow diagram of another embodiment of a method of configuring a telematics unit in a mobile vehicle, in accordance with the current invention.

DETAILED DESCRIPTION OF THE PRESENTLY PREFERRED EMBODIMENTS

Figure 1:
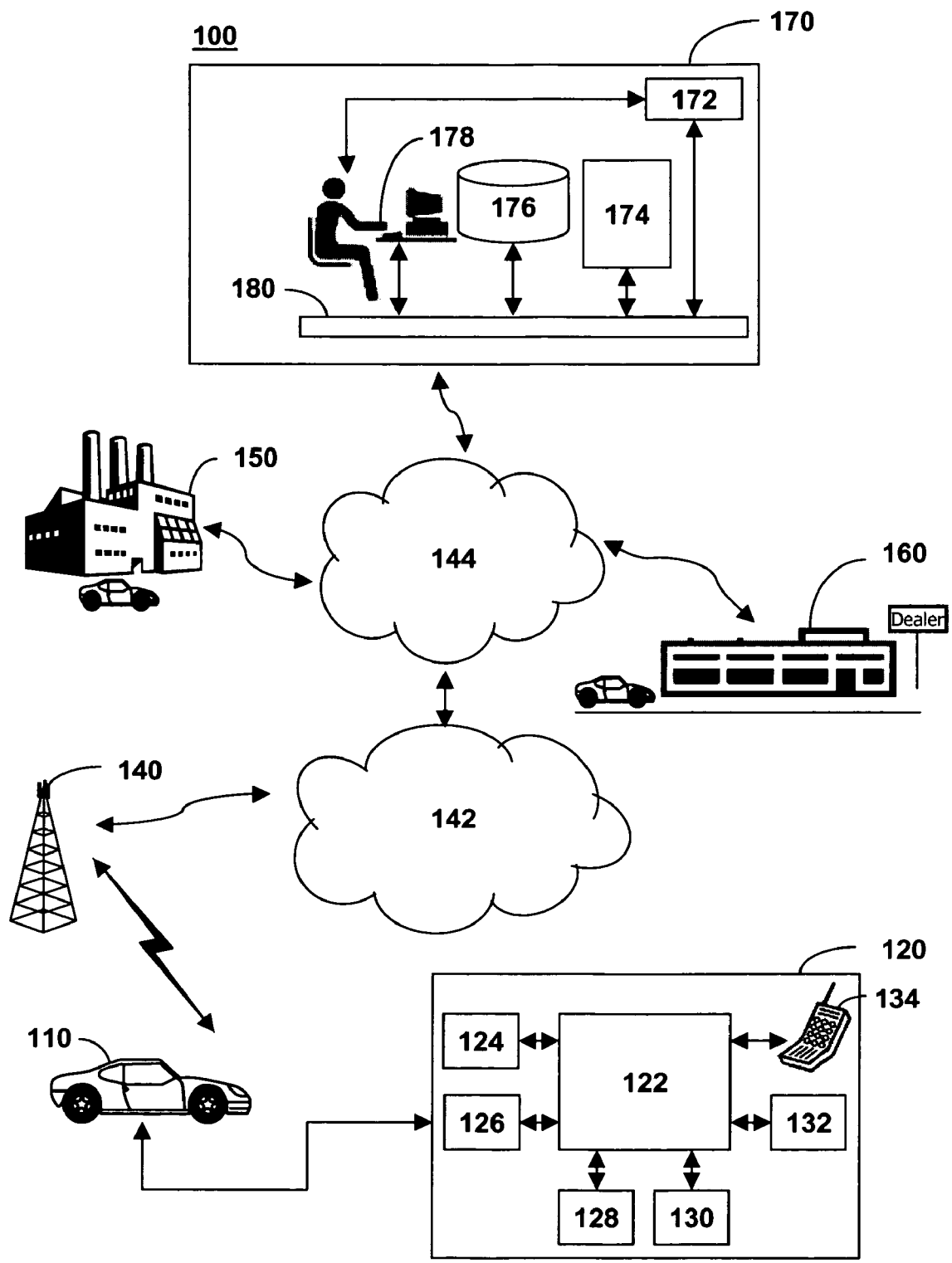
FIG. 1 is a schematic diagram of one embodiment of a system for configuring a telematics unit in a mobile vehicle, in accordance with the current invention.

The present invention enables a vehicle manufacturing and assembly plant to assign and load a predetermined system identifier (SID) and a preferred roaming list (PRL) into a telematics unit installed in a mobile vehicle. The SID and PRL may be determined based on the location of the vehicle dealership scheduled to receive the vehicle, the home address of the new owner, or other suitable destination information. The destination location may be indicated by, for example, by a zip code of the dealership or the new owner. The manufacturers of the telematics unit or the vehicle itself may load the assigned SID, the assigned PRL, and other destination-specific information into the telematics unit or into a cell phone embedded in the telematics unit. The loaded information allows the embedded cell phone to be activated and configured automatically when the vehicle reaches the intended destination, by checking to see if a locally broadcasted SID matches the assigned home SID stored in the unit. When the broadcast SID matches the stored SID, the telematics unit may initiate a procedure that allows wireless transfer of a MIN, MDN, updated PRL or other configuration parameters, which are stored in the telematics unit. OTASP or other suitable wireless carrier system protocols for transferring data to the embedded cell phone may be used to perform the desired transfers. In cases when the vehicle is not in an OTASP-enabled region during the setup, configuration of the system may need to be completed after the vehicle enters an OTASP-enabled region. Benefits of the invention allow a telematics unit to be fully functional for inbound and outbound calls upon arriving at the cellular service area of the local dealership, without requiring intervention by the dealership or the new owner.

FIG. 1 illustrates one embodiment of system for configuring and activating an in-vehicle telematics unit, in accordance with the present invention at 100. Configuration system 100 of an in-vehicle telematics unit includes a mobile vehicle 110, a telematics unit 120, one or more wireless carrier systems 140, one or more communication networks 142, one or more land networks 144, one or more vehicle manufacturing plants 150, one or more vehicle dealerships 160, and one or more call centers 170.

Mobile vehicle 110 may be a mobile vehicle equipped with suitable hardware and software for transmitting and receiving voice and data communications. In the exemplary embodiment of this present invention, mobile vehicle 110 is equipped with a CDMA-enabled telematics unit. Code division multiple access, or CDMA, is a digital wireless technology that uses a spread-spectrum technique to scatter a radio signal across a wide range of frequencies. One of the preferred processes of initiating and enrolling a CDMA-enabled telematics unit utilizes over-the-air service provisioning (OTASP) specified in TIA/EIA/IS-683-A (1998), "Over-the-Air Service Provisioning" standard. Alternative embodiments may use a wireless carrier system protocol of other digital technologies such as time division multiple access (TDMA) or Global System for Mobile Communications (GSM), the latter used primarily in Europe.

Telematics unit 120 may include a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. DSP 122 may also be referred to as a microcontroller, controller, host processor, or vehicle communications processor. GPS unit 126 may provide longitude and latitude coordinates of the vehicle. In-vehicle mobile phone 134 may be an analog, digital, dual-mode, dual-band, multi-mode or multi-band cellular phone.

DSP 122 executes various computer programs that control programming and operational modes of electronic and mechanical systems within mobile vehicle 110. In this exemplary embodiment, DSP 122 controls communications between telematics unit 120, wireless carrier system 140, and call center 170. A voice-recognition application that is installed in DSP 122 can translate human voice input through microphone 130 to digital signals. DSP 122 may generate and accept digital signals transmitted between telematics unit 120 and various electronic modules in the vehicle. These digital signals may activate the programming mode and operation modes, as well as provide for data transfers. Signals from DSP 122 may be translated into voice messages and sent out through speaker 132. DSP 122 controls and manages the configuration of telematics unit 120, and more specifically, mobile phone 134. DSP 122 may read and execute computer program code to configure and activate telematics unit 120 from one or more computer programs that are stored on any suitable computer usable medium such as programmable read-only memory (PROM), electrically-erasable programmable read-only memory (EEPROM), flash memory, compact disk (CD), digital video disk (DVD), or magnetic disks.

Mobile vehicle 110 via telematics unit 120 sends and receives radio transmissions from wireless carrier system 140. Wireless carrier system 140 is any suitable system for transmitting a signal from mobile vehicle 110 to communication network 142. The equipment of the wireless carrier system 140 transmits the system identifier and communicates with mobile vehicle 110. Wireless carrier system 140 may receive location and personal information about new subscribers including mobile phone 134 of telematics unit 120 and may have any suitable hardware and software capable of providing services to change and manage the configuration of mobile phones in the network of the wireless carrier. Computer servers of wireless carrier system 140 may store other information including a preferred roaming list, calling plan preferences, calling time allocations and configuration settings for telematics unit 120.

Communication network 142, which comprises services from one or more mobile switching centers and wireless networks, connects wireless carrier system 140 to land network 144. Communication network 142 is any suitable system or collection of systems for connecting wireless carrier system 140 to mobile vehicle 110 and land network 144.

Land network 144 is a public-switched telephone network. Land network 144 may be an Internet protocol (IP) network. Land network 144 is comprised of a wired network, an optical network, a fiber network, another wireless network, or any combination thereof. Land network 144 is connected to one or more landline telephones. Land network 144 may connect communication network 142 to vehicle manufacturing plant 150, vehicle dealership 160, and call center 170. Communication network 142 and land network 144 may connect wireless carrier system 140 to vehicle manufacturing plant 150, vehicle dealership 160 and call center 170.

Vehicle manufacturing plant 150 is the location, facilities and equipment required for assembling a new vehicle. Its equipment may include a computer usable medium to execute computer programs for sending and receiving data over land network 144 and optionally, wired or wireless communication networks 142. Vehicle manufacturing plant 150 configures certain programming and operational modes of electronic and mechanical systems within mobile vehicle 110 and telematics unit 120.

Vehicle manufacturing plant 150 sends new vehicles to vehicle transfer agents or to vehicle dealerships 160. Because the plant knows where mobile vehicle 110 is being shipped, it can load geographic-specific information into telematics unit 120. It may keep records of all information related to a specific mobile vehicle, such as its unique vehicle identification number (VIN), the location and address of the dealership destination, the name and address of the purchase, the electronic serial number (ESN) of the telematics unit, and other default telematics unit configurations appropriate to the area of vehicle dealership Vehicle manufacturing plant 150 may assign and load an initial home system identifier of a wireless carrier that is servicing the local area of vehicle dealership 160 or of the new owner. The system identifier is digital data that a wireless carrier broadcasts to identify itself within its home area.

Vehicle dealership 160 sells or leases new vehicles from a specific location. Vehicle dealership 160 may receive personal information from a new owner or leaser that is necessary for enrolling a person in a telematics service program offered by a telematics service call center and for having a wireless carrier system 140 fully activate and configure mobile phone 134. The information includes, but is not limited to an owner or leasee's name, home address, and preferred features or calling plan details with the wireless telephony service provider. In one embodiment of the present invention, vehicle manufacturing plant 150 sends the dealer or personal information and vehicle information including a VID and ESN to a telematics services call center 170, which manages telematics and personal calling services to mobile vehicle 110. In another embodiment of the present invention, vehicle manufacturing plant 150 sends a portion of the dealer or personal information such as a recipient's zip code and certain vehicle information including an ESN to a wireless service provider.

Call center 170 is a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may manage the activation of new in-vehicle telematics units with vehicle and dealership information received from vehicle manufacturing plant 150, as well as from vehicle dealership 160. Call center 170 may contain each of these functions.

Call center 170 contains one or more voice and data switches 172, one or more communication services managers 174, one or more communication services databases 176, one or more communication services advisors 178, and one or more bus systems 180.

Switch 172 of call center 170 connects to land network 144. Switch 172 transmits voice or data transmissions from call center 170, and receives voice or data transmissions from telematics unit 120 in mobile vehicle 110 through wireless carrier system 140, communication network 142, and land network 144. Switch 172 receives data transmissions from or sends data transmissions to one or more communication services managers 174 via one or more bus systems 180.

Communication services manager 174 is any suitable hardware and software capable of providing requested communication services to telematics unit 120 in mobile vehicle 110. Communication services manager 174 sends to or receives from one or more communication services databases 176 data transmissions via bus system 180. Communication services manager 174 sends to or receive from one or more communication services advisors 178 data transmissions via bus system 180. Communication services database 176 sends to or receives from communication services advisor 178 data transmissions via bus system 180. Communication services advisor 178 receives from or sends to switch 172 voice or data transmissions.

Communication services manager 174 may provide one or more of a variety of services, including enrollment services, navigation assistance, directory assistance, roadside assistance, business or residential assistance, information services assistance, emergency assistance, and communications assistance. Communication services manager 174 transmits user-preference and other data to telematics unit 120 in mobile vehicle 110 through wireless carrier system 140, communication network 142, land network 144, voice and data switch 172, and bus system 180. Communication services manager 174 stores or retrieves data and information from communication services database 176. Communication services manager 174 may provide requested information to communication services advisor 178.

Communication services advisor 178 may be a real advisor or a virtual advisor. A real advisor is a human being in verbal communication with a user or subscriber in mobile vehicle 110 via telematics unit 120. A virtual advisor may be a synthesized voice interface responding to requests from telematics unit 120 in mobile vehicle 110.

Communication services advisor 178 provides services to telematics unit 120 in mobile vehicle 110. Services provided by communication services advisor 178 may include enrollment services, navigation assistance, real-time traffic advisories, directory assistance, roadside assistance, business or residential assistance, information services assistance, emergency assistance, and communications assistance. Communication services advisor 178 may communicate with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 may initiate service request to call center 170 by sending a voice or digital-signal command to telematics unit 120 which in turn, sends an instructional signal or a voice call through wireless modem 124, wireless carrier system 140, communication network 142, and land network 144 to call center 170.

In initiating personal calling services with embedded mobile phone 134, call center 170 may negotiate and manage calling services offered to mobile vehicle 110. Call center 170 may be networked with vehicle manufacturing plant 150 to receive information on a new mobile vehicle 110 that allows telematics unit 120 to be activated. The information may include the zip code of the dealership address to determine which wireless service provider is the primary service provider for mobile vehicle 110. Vehicle manufacturing plant 150 or call center 170 may request wireless carrier system 140 to assign a MIN to telematics unit 120 of mobile vehicle 110 when the vehicle reaches the home area of the dealership or owner. The home area includes the area within the broadcast range of a system identifier that has been assigned and loaded at vehicle manufacturing plant 150. The personal information and zip code sent from vehicle manufacturing plant 150 or call center 170 may optionally include a non-geographic phone number supplied by the driver as an alternative to the MIN that wireless carrier system 140 would usually assign.

FIG. 2 is a flow diagram of one embodiment of a method for configuring a telematics unit in a mobile vehicle, in accordance with the present invention at 200. Configuration method 200 of the telematics unit begins by storing an assigned system identifier in the telematics unit, as seen at block 205. The assigned SID can be based on location information such as a zip code of a destination dealership or the home address of the new owner. The assigned SID corresponds to a broadcast SID at the intended destination.

An assigned preferred roaming list for the telematics unit may also be provided, as seen at block 210. A preferred roaming list is a list of bands and channels in order of preference that the phone uses when it attempts to locate and connect to a cell system outside its home region. The factory may receive periodically updated PRLs from wireless carriers along with information on the region or zip codes that each carrier serves. The assigned preferred roaming list may then be loaded and stored in the telematics unit at the vehicle manufacturing plant.

In addition to loading the assigned SID and assigned PRL, an update parameter flag may be set in the telematics unit. The update parameter flag may be used to indicate that telematics unit parameters such as the SID, PRL or MDN need to be updated or received when the vehicle is in the vicinity of the home wireless carrier. The update parameter flag may be, for example, a bit in an electronic word that may be set or cleared.

The wireless carrier is provided with an electronic serial number corresponding to the telematics unit, as seen at block 215. The wireless carrier may determine and assign a geographical MIN to the telematics unit based on its ESN and on a destination zip code of the vehicle. The destination is the zip code of the dealership or new owner that will receive delivery of the vehicle from the vehicle manufacturing plant. The vehicle manufacturing plant or a telematics service call center collects and sends to the wireless carrier any data required for configuring and enabling the telematics unit.

The wireless carrier continually broadcasts its system identifier in its home area. As it is being transported, the mobile vehicle awakens from its sleep mode periodically and monitors local wireless carrier broadcasts to determine whether the assigned system identifier of the telematics unit corresponds to a broadcast system identifier broadcast from the wireless carrier, as seen at block 220. Normally when the ignition of a mobile vehicle has been turned off, its telematics unit is placed into a discontinuous-receive (DRx) mode, a feature used to put network access devices and other electrical components into a quiescent or sleep mode to minimize current drain on the battery. The time period between wake-up operations may vary from ten minutes to several days or more when a vehicle has not been moved or driven.

An in-vehicle mobile phone attempts to register each time the telematics unit powers up and powers down. For example, a CDMA cellular phone may normally register one to three times per hour, but when it is incorporated into an in-vehicle wireless communication device with a discontinuous-receive mode, the registration interval may change to correspond with the DRx mode.

A determination is made on whether the assigned system identifier stored in the telematics unit corresponds to a broadcast system identifier broadcast from the wireless carrier. When the assigned system identifier does not correspond to the system identifier broadcast from a wireless carrier, the telematics unit returns to its sleep mode. After a predetermined time or when the ignition is turned on, the telematics unit will awaken and again monitor wireless carrier broadcasts for a SID that matches its assigned system identifier.

Once the telematics unit determines that its assigned system identifier corresponds to a broadcast system identifier from a wireless carrier, the telematics unit calls the wireless carrier, as seen at block 225. The wireless carrier is called when the broadcast system identifier matches the assigned system identifier.

Once it is determined that the assigned system identifier matches a broadcast system identifier, the telematics unit begins an OTASP activation process by transmitting its electronic serial number (ESN) to the wireless carrier over the air, as seen at block 230. The wireless carrier receives the ESN, which is matched with vehicle information and the MIN that the wireless carrier selected for that particular ESN. A call center, or alternatively, the vehicle assembly plant sends the vehicle information to the wireless carrier before the vehicle arrives at the market of the wireless carrier. The wireless carrier system may process the geographical MIN/MDN request.

A mobile identification number is received from the wireless carrier, as seen at block 235. The telematics unit may receive the MIN using over-the-air service provisioning (OTASP), which is employed with code division multiple access (CDMA) digital technology. Alternatively, it may be received using a wireless carrier system protocol of other digital technologies such as time division multiple access (TDMA) or Global System for Mobile Communications (GSM). The MIN is stored in the telematics unit as part of the phone activation process. Other cell phone system parameters such as an MDN or PRL may be received or updated using the wireless carrier system protocol.

An update parameter flag may have been set in the telematics unit. A corresponding telematics unit parameter may be updated based on the update parameter flag, as seen at block 240. The telematics unit parameter may be a mobile identification number, a mobile directory number, a home system identifier, a cell phone system parameter, or a telematics unit system parameter. Additionally, an updated preferred roaming list (PRL) may be downloaded. The telematics unit parameters may be transmitted and stored in the telematics unit, and the update parameter flag cleared.

FIG. 3 is a flow diagram of another embodiment of a method of configuring a telematics unit in a mobile vehicle, in accordance with the present invention at 300. Telematics-unit configuration method 300 begins at the vehicle manufacturing plant where a vehicle dealership destination is assigned to a mobile vehicle, as seen at block 305. The plant records information such as the vehicle identification number (VIN), the electronic serial number (ESN) of the in-vehicle telematics unit, the destination dealership name, and the address of the dealership including a zip code.

Vehicle data, including zip code of the dealership location and the ESN of the telematics unit, are sent to a wireless carrier that provides cellular phone service in the geographical area of the dealership, as seen at block 310.

Before the vehicle leaves the vehicle manufacturing plant, the telematics unit is loaded with a home system identifier based on the location of the dealer, as seen at block 315. The telematics unit of a new mobile vehicle may have software defaults set and certain features enabled so that a new user may be enrolled for services from a wireless carrier system as well as a telematics services call center. The manufacturer may record and send to an appropriate wireless service provider or call center the vehicle identification number (VIN), an electronic identification number of the vehicle communication processor or unit, the electronic serial number (ESN) of network access device (NAD) or embedded phone in the telematics unit, and an authentication key for the vendor, which all may be used to identify the vehicle and telematics unit during the enrollment process with the wireless service provider.

The manufacturer or vendor may load, for example, an enrollment hotline phone number into an international dialing table, which may contain the enrollment number, an emergency number and other phone numbers of up to fifteen digits. The manufacturer or vendor may load into a particular telematics unit, for example, an enrollment preferred roaming list (PRL) containing records of SIDs for all available markets enabled by OTASP. The manufacturer or vendor may set, for example, all records in the PRL to non-preferred and an acquisition-type preference of the enrollment PRL to factory-default first channel preference. The manufacturer or vendor may load, for example, a default OTASP initiation feature code and an automatic initiation system selection code that are provided by a selected wireless carrier system. That computer code may direct the telematics unit to monitor for a specific broadcast system identifier based on the location of the destination dealership and to begin the initiation process with the local wireless carrier when its SID is received.

The manufacturer or vendor may set initial parameters to a predefined state. The manufacturer or vendor may disable, for example, outgoing call capability. The manufacturer or vendor may set to a predefined state, for example, the number of registration attempts, a cellular registration control, a discontinuous receive (DRx) time-cycled wake-up function, an update parameter flag, and a calling center call function.

The mobile vehicle is shipped to the dealership. During transport, the telematics unit wakens up periodically from its powered-down or quiescent mode to monitor the local system identifiers being broadcast to check whether the assigned SID stored in its memory matches the SID of one of the broadcasts. The vehicle continues to wake up and get local SID information until it reaches the dealership area, as seen at block 320.

When the vehicle reaches the dealership area and the telematics unit awakens during its scheduled wake-up mode, the telematics unit determines that the assigned SID matches the SID of the wireless carrier in the area of the dealership, as seen at block 325. At that time, the telematics unit initiates an autonomous OTASP call to the wireless carrier.

The local wireless carrier receives the call in which the telematics unit transmits its ESN. The local wireless carrier assigns a MIN to the telematics unit based on the ESN, as seen at block 330. The carrier-assigned MIN and billing information is based on the factory data feed, as illustrated back at block 310. The MIN may be downloaded from the local carrier and stored in the telematics unit, as seen at block 335. Additional parameters and configuration settings may also be transmitted to the telematics unit based on information that a vehicle assembly plant or call center have sent to the wireless carrier. Geo-specific parameters and settings may be transmitted to the telematics unit. All communications among the manufacturing plant, call center, wireless carrier, dealership and telematics unit may be automated and data may be sent through intranet or Internet connections.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of automatically activating and configuring an embedded cell phone in a mobile telematics unit when the telematics unit reaches a predetermined location, the method comprising:
    storing an assigned system identifier in the telematics unit, the assigned system identifier corresponding to the predetermined location;
    receiving at the telematics unit a sequence of broadcast system identifiers;
    determining for one of the received broadcast system identifiers corresponding to a wireless carrier that the broadcast system identifier corresponds to the assigned system identifier;
    calling the wireless carrier based on the determination to activate the embedded cell phone; and
    receiving at the telematics unit a mobile identification number from the wireless carrier for assignment to the embedded cell phone.

2. The method of claim 1 wherein the assigned system identifier is based on a destination zip code.

3. The method of claim 1 wherein the mobile identification number is received using over-the-air service provisioning.

4. The method of claim 1 wherein the mobile identification number is received using a wireless carrier system protocol.

5. The method of claim 1 further comprising:
    receiving an assigned preferred roaming list for the telematics unit from the wireless carrier; and
    storing the assigned preferred roaming list in the telematics unit.

6. The method of claim 1 further comprising:
    providing the wireless carrier with an electronic serial number corresponding to the telematics unit and a destination zip code, wherein the mobile identification number is based on the electronic serial number and the destination zip code.

7. The method of claim 1 further comprising:
    transmitting an electronic serial number from the telematics unit to the wireless carrier.

8. The method of claim 1 further comprising:
    setting an update parameter flag in the telematics unit; and
    updating a telematics unit parameter based on the update parameter flag.

9. The method of claim 8 wherein the telematics unit parameter is selected from the group consisting of a mobile identification number, a mobile directory number, a home system identifier, a preferred roaming list, a cell phone system parameter, and a telematics unit system parameter.

10. A computer usable medium including a program to automatically activate and configure an embedded cell phone in a mobile telematics unit when the telematics unit reaches a predetermined location, the program comprising:
    computer program code to store an assigned system identifier in the telematics unit, the assigned system identifier corresponding to the predetermined location;
    receiving at the telematics unit a sequence of broadcast system identifiers;

computer program code to determine for one of the received broadcast system identifiers corresponding to a wireless carrier that the broadcast system identifier corresponds to the assigned system identifier;

computer program code to call the wireless carrier based on the determination to activate the embedded cell phone; and computer program code to receive at the telematics unit a mobile identification number from the wireless carrier for assignment to the embedded cell phone.

11. The computer usable medium of claim 10 further comprising:

computer program code to provide an assigned preferred roaming list for the telematics unit; and computer program code to store the assigned preferred roaming list in the telematics unit.

12. The computer usable medium of claim 10 further comprising:

computer program code to provide the wireless carrier with an electronic serial number corresponding to the telematics unit and a destination zip code; and computer program code to assign the mobile identification number based on the electronic serial number and the destination zip code.

13. The computer usable medium of claim 10 further comprising:

computer program code to transmit an electronic serial number from the telematics unit to the wireless carrier.

14. The computer usable medium of claim 10 further comprising:

computer program code to set an update parameter flag in the telematics unit; and computer program code to update a telematics unit parameter based on the update parameter flag.

15. A system for automatically activating and configuring an embedded cell phone in a mobile telematics unit when the telematics unit reaches a predetermined location, the program comprising:

means for storing an assigned system identifier in the telematics unit, the assigned system identifier corresponding to the predetermined location;

means for receiving at the telematics unit a sequence of broadcast system identifiers;

means for determining for one of the received broadcast system identifiers corresponding to a wireless carrier that the broadcast system identifier corresponds to the assigned system identifier;

means for calling the wireless carrier based on the determination to activate the embedded cell phone; and means for receiving at the telematics unit a mobile identification number from the wireless carrier for assignment to the embedded cell phone.

16. The system of claim 15 further comprising:

means for providing the wireless carrier with an electronic serial number corresponding to the telematics unit and a destination zip code; and means for assigning the mobile identification number based on the electronic serial number and the destination zip code.

17. The system of claim 15 further comprising:

means for providing the wireless carrier with an electronic serial number corresponding to the telematics unit; and means for assigning the mobile identification number based on the electronic serial number and a destination zip code.

18. The system of claim 15 further comprising:

means for transmitting an electronic serial number from the telematics unit to the wireless carrier.

19. The system of claim 15 further comprising:

means for setting an update parameter flag in the telematics unit; and means for updating a telematics unit parameter based on the update parameter flag.

* * * * *